(12) United States Patent
Clark

(10) Patent No.: US 9,611,163 B2
(45) Date of Patent: Apr. 4, 2017

(54) PROCESS AND APPARATUS FOR REFINING MOLTEN GLASS

(71) Applicant: Owens-Brockway Glass Container Inc., Perrysburg, OH (US)

(72) Inventor: Terence J Clark, Bowling Green, OH (US)

(73) Assignee: Owens-Brockway Glass Container Inc., Perrysburg, OH (US)

( * ) Notice: Subject to any disclaimer, the term of this patent is extended or adjusted under 35 U.S.C. 154(b) by 29 days.

(21) Appl. No.: 14/198,083

(22) Filed: Mar. 5, 2014

(65) Prior Publication Data
US 2015/0251941 A1 Sep. 10, 2015

(51) Int. Cl.
*C03B 5/225* (2006.01)
*C04B 38/00* (2006.01)
*C04B 38/06* (2006.01)

(52) U.S. Cl.
CPC ............ *C03B 5/225* (2013.01); *C03B 5/2252* (2013.01); *C03B 5/2255* (2013.01); *C04B 38/0003* (2013.01); *C04B 38/0006* (2013.01); *C04B 38/0038* (2013.01); *C04B 38/0615* (2013.01)

(58) Field of Classification Search
CPC   C03B 5/207; C03B 5/20; C03B 5/225; C03B 5/2255; C03B 5/182; C03B 5/2257; C03B 5/262; C03B 5/2252; C04B 38/0006; C04B 38/0064; C04B 38/007; C04B 38/065; C04B 35/865
See application file for complete search history.

(56) References Cited

U.S. PATENT DOCUMENTS

| | | | | |
|---|---|---|---|---|
| 1,744,359 A | * | 1/1930 | Brown | C03B 5/205 65/135.1 |
| 2,212,528 A | * | 8/1940 | Slayter | C03B 5/0336 373/31 |
| 2,331,052 A | * | 10/1943 | Shadduck | C03B 5/225 373/27 |
| 2,485,851 A | * | 10/1949 | Stevens | C03B 5/021 373/27 |
| 2,871,000 A | * | 1/1959 | Dowling | C03B 5/187 366/289 |
| 3,244,496 A | * | 4/1966 | Apple | C03B 5/182 373/33 |
| 3,516,799 A | | 6/1970 | Dotson | |

(Continued)

FOREIGN PATENT DOCUMENTS

WO    2010000611    1/2010
WO    2010112781    10/2010

OTHER PUBLICATIONS

Colombo (Colombo, P., "conventional and novel processing methods for cellular ceramics", Pil. Trans. R. Soc. A (2006) 364, 109-124.*

(Continued)

*Primary Examiner* — Jason L Lazorcik

(57) ABSTRACT

A process and an apparatus for refining molten glass. The apparatus includes a porous body having an inlet, an outlet, and a plurality of pores through which molten glass can flow between the inlet and the outlet. The plurality of pores are defined by walls having wall surfaces that are configured to interact with the molten glass as the molten glass flows between the inlet and the outlet to help refine the molten glass.

30 Claims, 6 Drawing Sheets

(56) References Cited

U.S. PATENT DOCUMENTS

| | | | |
|---|---|---|---|
| 3,926,607 A | 12/1975 | Pellett | |
| 3,938,981 A * | 2/1976 | St. John | C03B 5/2255 65/134.7 |
| 3,951,635 A | 4/1976 | Rough, Sr. | |
| 3,962,081 A * | 6/1976 | Yarwood | B01D 39/2093 210/510.1 |
| 4,158,632 A * | 6/1979 | Dantzig | C04B 38/0051 210/416.1 |
| 4,159,104 A * | 6/1979 | Dantzig | C22B 9/05 266/215 |
| 4,165,235 A * | 8/1979 | Dantzig | C22B 9/05 266/227 |
| 4,177,066 A | 12/1979 | Clumpner | |
| 4,406,683 A | 9/1983 | Demarest, Jr. | |
| 4,610,711 A | 9/1986 | Matesa et al. | |
| 5,114,472 A * | 5/1992 | Eckert | C22B 9/023 164/134 |
| 5,322,546 A | 6/1994 | Holsgrove et al. | |
| 5,609,661 A | 3/1997 | Moreau et al. | |
| 5,673,902 A * | 10/1997 | Aubrey | B22D 43/004 210/184 |
| 5,928,402 A * | 7/1999 | Mirth | C03B 5/182 65/134.1 |
| 6,036,743 A * | 3/2000 | Butcher | C22B 9/023 266/227 |
| 6,245,698 B1 * | 6/2001 | Pope | C03C 11/007 501/12 |
| 6,663,776 B2 * | 12/2003 | Hoffman | B01D 39/2093 210/503 |
| 6,854,290 B2 | 2/2005 | Hayes et al. | |
| 6,993,936 B2 | 2/2006 | Grzesik et al. | |
| 7,007,514 B2 * | 3/2006 | Sakai | C03B 5/2252 65/134.2 |
| 7,383,698 B2 | 6/2008 | Ichinose et al. | |
| 7,451,621 B2 | 11/2008 | Pelton | |
| 7,510,588 B2 | 3/2009 | Kudo | |
| 7,534,482 B2 | 5/2009 | Yoshida | |
| 7,565,819 B2 | 7/2009 | Jeanvoine et al. | |
| 7,624,595 B2 | 12/2009 | Jeanvoine et al. | |
| 7,666,248 B2 * | 2/2010 | Belley | B22D 11/119 266/227 |
| 7,874,179 B2 | 1/2011 | Rue et al. | |
| 8,153,073 B2 | 4/2012 | Ohno | |
| 9,029,813 B2 * | 5/2015 | Fomenkov | B22F 3/105 250/504 R |
| 2002/0180117 A1 * | 12/2002 | Yamamoto | B01D 39/2068 264/630 |
| 2003/0053940 A1 * | 3/2003 | Harada | B01D 39/2068 422/180 |
| 2003/0180171 A1 * | 9/2003 | Artz | B22F 1/0059 419/2 |
| 2004/0068971 A1 * | 4/2004 | Kuki | B01D 46/247 55/523 |
| 2004/0134235 A1 * | 7/2004 | Pitbladdo | C03B 5/225 65/346 |
| 2004/0182113 A1 * | 9/2004 | Tomamoto | C03B 5/182 65/135.1 |
| 2005/0180898 A1 | 8/2005 | Yamada | |
| 2006/0000239 A1 * | 1/2006 | Jeanvoine | C03B 5/225 65/134.7 |
| 2006/0222812 A1 | 10/2006 | Koyama et al. | |
| 2007/0084247 A1 * | 4/2007 | Pitbladdo | C03B 5/182 65/346 |
| 2009/0022991 A1 | 1/2009 | Deleplace et al. | |
| 2009/0235694 A1 * | 9/2009 | Miyazaki | C03B 5/225 65/346 |
| 2009/0249834 A1 * | 10/2009 | Rue | C03B 5/225 65/134.9 |
| 2012/0103021 A1 | 5/2012 | Antoine et al. | |
| 2012/0160395 A1 | 6/2012 | Ohno | |
| 2012/0210751 A1 | 8/2012 | Rue et al. | |
| 2012/0216571 A1 * | 8/2012 | Sakamoto | C03B 3/026 65/66 |
| 2014/0090424 A1 * | 4/2014 | Charbonneau | C03B 3/00 65/134.9 |

OTHER PUBLICATIONS

PCT Search Report and Written Opinion, Int. Serial No. PCT/US2015/017957, Int. Filing Date: Feb. 27, 2015, Applicant: Owens-Brockway Glass Container Inc. Mail Date: Jun. 2, 2015.

\* cited by examiner

PROCESS AND APPARATUS FOR REFINING MOLTEN GLASS

The present disclosure is directed to a process and an apparatus for producing molten glass, and, more particularly, to a process and an apparatus for refining molten glass.

BACKGROUND AND SUMMARY OF THE DISCLOSURE

Silica-based glass, such as soda-lime-silica glass, is prevalent in the manufacture of glass containers and other articles. Molten glass used to make such articles is conventionally prepared by melting a mixture of glass-forming materials known as a batch in one end of a continuous tank furnace. The resulting molten glass typically contains an undesirable amount of gas bubbles, commonly referred to as seeds. The gas bubble content of this unrefined molten glass is typically reduced to a desirable level by heating the molten glass to a relatively high temperature to reduce the viscosity of the molten glass so that gas bubbles within the molten glass can gradually rise to a free surface thereof and escape in a suitable amount of time. In such processes, rising convection currents within the molten glass are typically relied upon to bring the gas bubbles to the surface of the molten glass.

A general object of the present disclosure, in accordance with one aspect of the disclosure, is to provide an apparatus and a process for increasing the rate at which gas bubbles are released and/or removed from a flow of molten glass, as compared to conventional refining processes. The apparatus and process of the present disclosure also may reduce the temperature at which the molten glass must be heated to effectively refine the molten glass.

The present disclosure embodies a number of aspects that can be implemented separately from or in combination with each other.

A porous body for refining a stream of molten in accordance with one aspect of the disclosure includes: an inlet, an outlet in fluid communication with the inlet and spaced apart from the inlet in a longitudinal direction, and a plurality of pores through which molten glass can flow between the inlet and the outlet. The pores of the porous body are defined by walls having wall surfaces that are configured to interact with the molten glass as the molten glass flows between the inlet and the outlet to help refine the molten glass. This may be accomplished by promoting release of gas bubbles from the molten glass, for example, by promoting coalescence of the gas bubbles within the molten glass or by increasing the size of the gas bubbles within the molten glass. In other embodiments, this may be accomplished by reducing the size of the gas bubbles within the molten glass to a commercially acceptable size.

In accordance with another aspect of the disclosure, there is provided an apparatus for melting and refining molten glass that includes: a melter, a refiner downstream of the melter, a throat between the melter and the refiner, and a porous body having an inlet and an outlet in fluid communication with the inlet. The porous body may be disposed within the melter, the refiner, and/or the throat. The porous body includes a plurality of pores through which molten glass can flow between the inlet and the outlet. The pores of the porous body are defined by walls having wall surfaces that are configured to help refine the molten glass. For example, the wall surfaces may be configured to promote coalescence of gas bubbles within the molten glass to increase the size of the gas bubbles, or the wall surfaces may be configured to reduce the size of gas bubbles within the molten glass to a commercially acceptable size. In some embodiments, the wall surfaces may be configured to interact with the molten glass to produce carbon dioxide ($CO_2$) gas, nitrogen oxide ($NO_x$) gas, or both.

In accordance with yet another aspect of the disclosure, there is provided an apparatus for melting and refining molten glass that includes: a meter having an upstream end and an opposite downstream end; a throat in fluid communication with the downstream end of the melter; and a porous body having an inlet, an outlet in fluid communication with the inlet, and a plurality of pores through which molten glass can flow between the inlet and the outlet. The porous body is configured to intercept molten glass that is flowing from the downstream end of the melter into the throat and to interact with the molten glass to promote release of gas bubbles from the molten glass or to reduce the size of the gas bubbles within the molten glass to a commercially acceptable size.

In accordance with another aspect of the disclosure, there is provided a process for refining molten glass in which molten glass is provided that includes a plurality of gas bubbles. A porous body is also provided that includes an inlet, an outlet in fluid communication with the inlet, and a plurality of pores through which molten glass can flow between the inlet and the outlet. The plurality of pores of the porous body are defined by walls having wall surfaces. The molten glass is flowed through the porous body and through the plurality of pores such that interaction between the molten glass and the wall surfaces of the pores promotes release of gas bubbles from the molten glass, or causes at least some of the gas bubbles within the molten glass to collapse or rupture to reduce the size of the gas bubbles to a commercially acceptable size.

BRIEF DESCRIPTION OF THE DRAWINGS

The disclosure, together with additional objects, features, advantages and aspects thereof, will be best understood from the following description, the appended claims and the accompanying drawing(s), in which:

DETAILED DESCRIPTION

Figure 1:
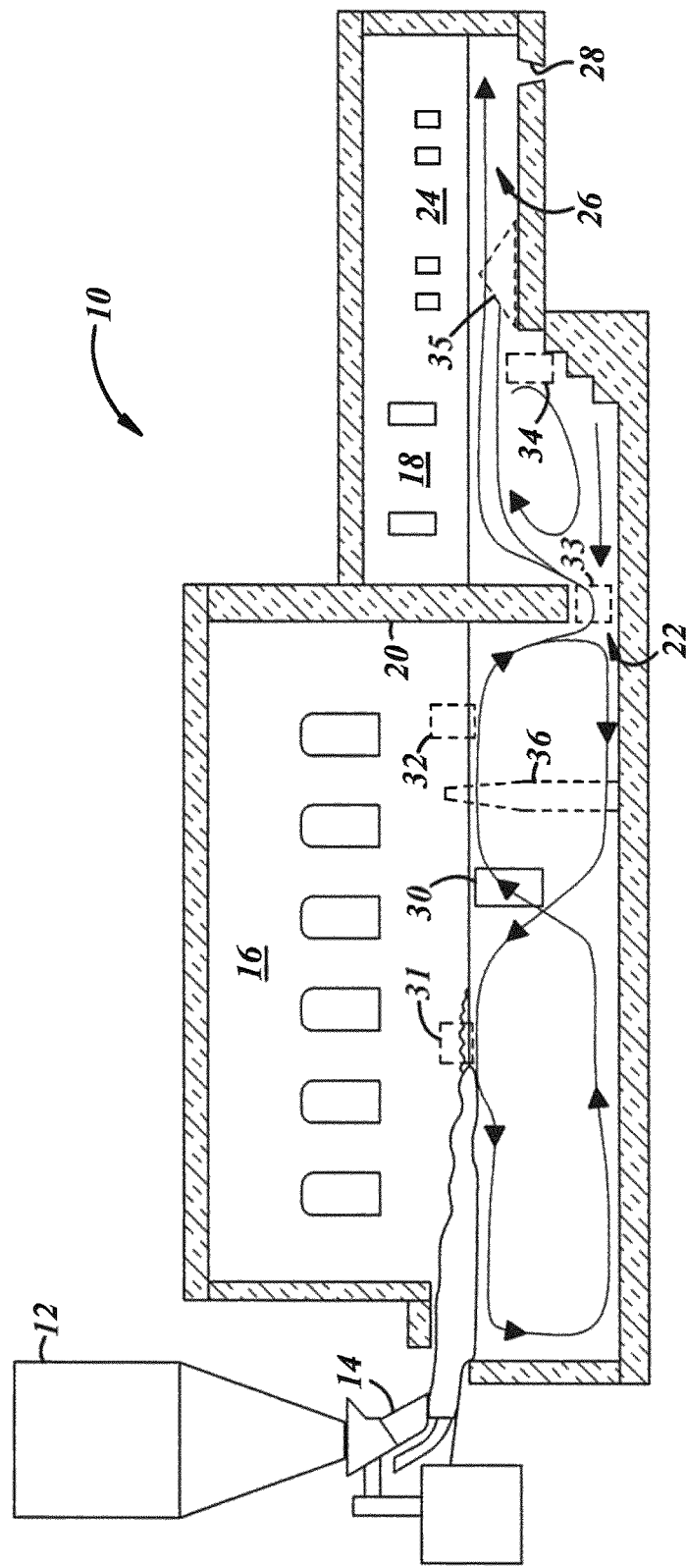
FIG. 1 is a schematic side cross-sectional view of a glass furnace for melting and refining molten glass in accordance with an illustrative embodiment of the present disclosure.

The process and apparatus for refining molten glass disclosed herein may be used to refine various silica-based glass compositions, including, for example, soda-lime-silica glass. In addition, the process and apparatus of the present disclosure may be incorporated into various glass manufacturing processes and various glass furnace designs, including, but certainly not limited to, the illustrative glass manufacturing processes and glass furnace designs shown in the drawings and described herein below. Some specific types of glass furnaces that may benefit from the process and apparatus of the present disclosure include glass furnaces that are heated by submerged combustion or plasma arc melting processes.

FIG. 1 illustrates a glass furnace 10 for melting and refining molten glass in accordance with an illustrative embodiment of the present disclosure. An upstream end of the furnace 10 includes a hopper 12 and a glass batch charger 14 that directs glass-forming materials from the hopper 12 into a melting chamber 16. The glass-forming materials are heated in the melting chamber 16 to melt the glass-forming materials into a body of molten glass. A refining chamber 18 is located downstream of the melting chamber 16 and is separated from the melting chamber 16 by a partition wall 20. The refining chamber 18 receives molten glass from the inciting chamber 16 through an opening 22 in the partition wall 20 known as a throat. A forehearth 24 is located downstream of the refining chamber 18 and includes a relatively shallow feeder channel 26. The forehearth 24 receives molten glass from the refining chamber 18 and distributes gobs of molten glass to glassware forming machines via a feeder spout 28 located at a working end of the furnace 10. With respect to the furnace 10, the term "downstream" generally means in a direction from the upstream end of the furnace 10 to the working end of the furnace 10.

The glass furnace 10 also includes a porous body 30 that is at least partially submerged within the molten glass in the glass furnace 10, and is preferably at least partially submerged within a flow path of a flowing stream of molten glass in the furnace 10. For example, the porous body 30 may be at least submerged within an upper region or a lower region of a molten glass flow, or the porous body 30 may extend across the entire cross section of the molten glass flow through the furnace 10. In some embodiments, the porous body 30 may have a low profile and may be positioned within the furnace 10 such that molten glass flows over the porous body 30 as the molten glass travels through the furnace 10, from the upstream end to the working end thereof. Incorporating the porous body 30 into the design of the glass furnace 10 can increase the rate at which molten glass is refined in the furnace, and can also decrease the temperature at which the molten glass must be heated within the furnace 10 to effectively refine the molten glass.

The porous body 30 may take on any number of different three-dimensional, i.e., non-planar, shapes depending upon the desired location or position of the porous body 30 within the glass furnace 10. For example, the porous body 30 may be in the shape of a sphere, an ellipsoid, a cube, a rectangular prism, a triangular prism, a pyramid, a cylinder, a cone, or any other three-dimensional shape. In some embodiments, the porous body 30 may be irregularly shaped. For example, the porous body 30 may be constructed to conform to the shape and size of a region within the glass furnace 10 where the porous body 30 will be located.

The porous body 30 has a flow-through structure and includes a labyrinth of inner passageways, conduits, or pores through which a stream of molten glass can flow. The inner passageways of the porous body 30 may be configured such that a stream of molten glass can flow through the porous body 30 from an upstream end to a downstream end thereof. Additionally or alternatively, the inner passageways of the porous body 30 may be configured such that a stream of molten glass can flow in multiple directions through the porous body 30. The inner passageways of the porous body 30 may range in size from 0.5 mm to 20 mm, and may provide the porous body 30 with a relatively high void volume and a relatively high internal surface area.

In some embodiments, the inner passageways of the porous body 30 may provide the porous body 30 with an effective porosity in the range of 0.75 to 0.95, including all ranges and subranges therebetween. The term "porosity," as used herein, refers to the proportion of the volume of the porous body 30 that is open, that is, unoccupied by solid material, and can include the proportion of the volume that is occupied by molten glass. The number of pores per linear inch of the porous body 30 may range from 5 to 100 pores per linear inch (PPI), including all ranges and subranges therebetween.

The inner passageways of the porous body 30 may be defined by walls having wall surfaces. In some embodiments, the inner passageways of the porous body 30 may include a plurality of discrete flow-through channels defined by continuous channel walls that extend from the upstream end to the downstream end of the porous body 30. In other embodiments, the porous body 30 may have a reticulated foam-like structure, for example, and may include a series of interconnected cell walls that define a three-dimensional network of interconnected open pores.

The size, shape, and interconnectivity of the inner passageways of the porous body 30 and the roughness of the wall surfaces within the porous body 30 are configured in a manner which helps increase the refining rate of a flow of molten glass. For example, the wall surfaces within the porous body 30 may be configured to increase the rate at which gas bubbles are released from the molten glass. The structure of the porous body 30 may be configured to promote gas bubble agglomeration, coalescence, formation, or division, depending upon the desired glass refining situation.

For example, the wall surfaces of the porous body 30 may be configured to interact with the molten glass and with the gas bubbles therein in a manner which causes the gas bubbles in the molten glass to come into relatively close proximity with one another and/or to collect on the wall surfaces of the porous body 30 such that at least some of the gas bubbles coalesce into larger gas bubbles. In some embodiments, the wall surfaces of the porous body 30 may be concave to encourage gas bubbles to collect along the wall surfaces and coalesce. The concave wall surfaces also may function to trap gas bubbles within the porous body 30, if desired. Coalescence of the gas bubbles into larger gas bubbles increases the buoyancy of the bubbles and also decreases their surface area, which allows the gas bubbles to rise more rapidly within the molten glass.

Also, the wall surfaces of the porous body 30 may be configured to chemically react with the molten glass to form additional gas bubbles within the molten glass. And these additional gas bubbles may interact with the gas bubbles already present in the molten glass to produce new gas bubbles that are relatively large in size, as compared to the size of the gas bubbles initially present in the glass. The relatively large size of the new gas bubbles will allow them to rise through the molten glass at a faster rate than the relatively small gas bubbles that were initially present in the molten glass. The formation of additional gas bubbles within the molten glass may be accomplished by incorporating into the walls or wall surfaces of the porous body 30 a material that contains free carbon and/or nitrogen, or a material that dissociates to provide free carbon and/or nitrogen, as such materials can effectively react with silica-based glass compositions to produce carbon dioxide ($CO_2$) and/or nitrogen oxide ($NO_x$) gas. Some suitable examples of materials that contain free carbon and/or nitrogen, or that dissociate to provide free carbo and/or nitrogen, include silicon carbide (SiC), silicon nitride ($Si_3N_4$), and silicon carbonitride (SiCN). If silicon carbide (SiC) is used, carbon dioxide ($CO_2$) gas may be produced by oxidation of the free carbon that is formed after the dissociation of the silicon carbide (SiC). If the silica-based glass contains iron oxide, e.g., Fe2O3, the iron oxide also may react with the free carbon to facilitate the formation of carbon dioxide ($CO_2$) gas. Sulfur dioxide ($SO_2$) gas also may be produced in the molten glass to help produce new, relatively large sized gas bubbles by adding sodium sulfate ($Na_2SO_4$) to the glass batch composition prior to melting.

In other embodiments, the wall surfaces of the porous body 30 may be configured to interact with the molten glass and with the gas bubbles therein in a manner which causes at least some of the gas bubbles to collapse or rupture, thereby decreasing the size of the gas bubbles within the molten glass to a commercially acceptable size. Decreasing the size of the gas bubbles within the molten glass, such that the mean diameter of the gas bubbles within the molten glass is below a preselected value, e.g., not greater than 0.2 mm, may render the glass acceptable for use in the production of various types of glass articles without having to remove the gas bubbles from the molten glass.

The porous body 30 may be "monolithic." For example, the porous body 30 may consist of a rigid three-dimensional, continuous, porous structure, which may be formed as a single piece or an integral unit. As such, the porous body 30 may be contrasted with other types of porous media that are formed from a plurality of separate components, like screen assemblies, or discrete particles, aggregates, or fibers packed into a volume. Packed beds of sand and diatomaceous each are two particular examples of porous media that are preferably excluded from the present disclosure.

A porous body having a flow-through structure, such as the porous body 30 of the present disclosure, has not been used previously in refining molten glass. In addition, the structure of the porous body 30 differs in many significant aspects from other structures disclosed in the prior art. In particular, the structure of the porous body 30 may be characterized by a relatively high porosity and a relatively high internal surface area, as contrasted with planar structures, e.g. meshes, screens, and perforated sheets, which are not typically characterized by these attributes and do not have sufficient internal surface areas to effectively refine a stream of molten glass.

The porous body 30 may be positioned within the flow path of a stream of molten glass that is flowing between the upstream end and the working end of the furnace 10, and may be positioned at any number of different locations within the furnace 10. In particular, the porous body 30 may be positioned within the furnace 10 such that a stream of molten glass flowing through the furnace 10 will interact with the porous body 30 as the stream advances toward the working end of the furnace 10. In some embodiments, the porous body 30 may be positioned within the furnace 10 such that a stream of molten glass flowing through the furnace 10 will be directed through the porous body 30 as the stream advances toward the working end of the furnace 10. In other embodiments, the porous body 30 may be positioned such that molten glass flowing through the furnace 10 flows over and/or around the porous body 30 as the molten glass advances toward the working end of the furnace 10.

In one embodiment, the porous body 30 may be positioned within a region of the furnace 10 where the molten glass is relatively hot and/or within a region of the furnace 10 where the molten glass has a relatively high content of gas bubbles. Such regions may occur at or near convection currents within the molten glass, which typically form as a result of thermal gradients in the molten glass. For example, the porous body 30 may be positioned within the flow path of an upwardly rising bubble-containing convection current that is flowing at an intermediate location within the body of molten glass in the melting chamber 16. The location of this type of convection current is commonly referred to as a spring zone.

In another embodiment, the porous body 30 may be positioned within the flow path of an upwardly rising convection current that has been formed within the body of molten glass due to localized heating of the molten glass. Various regions within the body of molten glass in the furnace 10 may be locally heated, for example, by submerged electrodes. In such case, the porous body 30 may be positioned to intercept the relatively hot and relatively low viscosity molten glass as the glass rises within the furnace 10 above the electrodes.

As indicated by the dashed outlines illustrated in FIG. 1, one or more alternative or additional porous bodies may be positioned at any number of different locations within the furnace 10 to help refine a stream of molten glass that is flowing between the upstream end and the working end of the furnace 10.

For example, one or more porous bodies 31, 32 may be positioned at, along, or intersecting the surface of the body of molten glass within the melting chamber 16. In this arrangement, the porous bodies 31, 32 may act as baffles or skimmers to help remove gas bubbles from the molten glass that have accumulated at or near the surface of the molten glass.

One or more porous bodies also may be positioned within the flow path of a stream of molten glass that is flowing through a constriction or narrowing passageway in the furnace 10. Constrictions in the flow path of the molten glass within the furnace 10 may occur at locations where the molten glass flows from one chamber to another, as well as near the exit or outlet of the glass furnace 10. For example, a porous body 33 may be positioned within the opening 22 in the partition wall 20 between the melting chamber 16 and the refining chamber 18. In this location, the porous body 33 may function as a gate or other obstacle that intercepts gas bubbles within the stream of molten glass leaving the melting chamber 16 to help reduce the number and/or the size of the gas bubbles entering the refining chamber 18.

In embodiments where the glass furnace 10 includes a floor with a portion that is inclined in a generally upward or downward direction, one or more porous bodies may be positioned on, over, or within the inclined portion of the floor. For example, another porous body 34 may be positioned over an inclined portion of the floor within the refining chamber 18 leading to the forehearth 24. In this position, the porous body 34 can intercept gas bubbles within the flowing stream of molten glass before the molten glass enters the forehearth 24.

One or more porous bodies also may be positioned at the entrance to the forehearth 24. For example, a porous body 35 may be positioned on, over, or within a shallow shelf within the feeder channel 26 of the forehearth 24. In such case, the porous body 35 may be shaped in the form of ramp or a rectangular pyramid that includes angled faces extending from a base. Forming the porous body 35 with angled upstream and downstream faces may help direct the stream of molten glass to flow in a generally upward direction over and/or through the porous body 35. Directing the stream of molten glass to flow in a generally upward direction may encourage gas bubbles in a lower portion of the stream to ascend within the body of molten glass towards a free surface thereof. The porous body 35 also may be configured such that a relatively thin layer of glass flows over the porous body 35 so that gas bubbles within the relatively thin layer can rapidly ascend to a free surface of the molten glass and escape. For example, the porous body 35 may have a relatively low profile and a relatively thin layer of molten glass may be flowed over and through the porous body 35.

One or more porous bodies may be configured to extend across the entire cross section of the body of molten glass within the furnace 10. For example, a porous body 36 may be positioned within the furnace 10 such that the porous body 36 extends across the entire width of the body of molten glass, from a floor of the furnace 10 to a location at or above the surface of the body of molten glass.

The porous bodies 30, 31, 32, 33, 34, 35, 36 may be positioned within the flow path of a stream of molten glass within the glass furnace 10 by any suitable method. For example, the porous bodies may be carried by, mounted onto, or integrated into a portion of the glass furnace 10 that is located below a free surface of the molten glass within the furnace 10, e.g., a floor or a submerged portion of a sidewall of the furnace 10. As another example, one or more of the porous bodies may be at least partially submerged within the molten glass within the furnace 10 by being suspended from a location above the free surface of the molten glass within the furnace 10.

In some embodiments, one or more of the porous bodies 30, 31, 32, 33, 34, 35, 36 may be heated to increase or maintain the temperature of the molten glass flowing therethrough. For example, the temperature of the molten glass within the porous bodies may be increased to a temperature above that of the molten glass surrounding the porous bodies. Increasing the temperature of the molten glass will reduce the viscosity of the molten glass, which may promote release of gas bubbles from the molten glass and also may cause some of the gas bubbles within the molten glass to rupture.

The porous bodies within the furnace 10 may be heated by an external source of heat or by an internal heat source. For example, the porous bodies may be heated by combusting a fuel within a portion of the porous bodies or by flowing a relatively hot gas stream through a portion of the porous bodies that is not in contact with the stream of molten glass. In other embodiments, one or more of the porous bodies may be heated by directing microwave energy at the porous bodies. In such embodiments, the porous bodies may be made of or coated with a microwave susceptor material.

The flow of molten glass through one or more of the porous bodies 30, 31, 32, 33, 34, 35, 36, and the release of gas bubbles from the molten glass, may be promoted or induced by applying a vacuum to one or more surfaces of the porous bodies, by applying a centrifugal force to the molten glass within the porous bodies, and/or by inducing vibrations, reciprocation, articulation, agitation, or other movement in the porous bodies.

The use of a vacuum may help transport the molten glass and the gas bubbles through the porous bodies at a faster rate, and also may encourage the molten glass to flow through the porous bodies, instead of around the porous bodies. In addition, exposing a surface of one or more of the porous bodies to a vacuum or sub-atmospheric pressure environment may help increase the rate at which the gas bubbles in the molten glass ascend to a free surface thereof.

A centrifugal force may be applied to the molten glass within one or more of the porous bodies 30, 31, 32, 33, 34, 35, 36 by rotating one or more of the porous bodies about axes, e.g., central axes, thereof at a suitable speed. In other embodiments, a centrifugal force may be applied to the molten glass within the porous bodies by placing the porous bodies within a device that is rotating, e.g., a carousel or other vessel.

Referring now to FIGS. 2-5, which include schematic illustrations of a porous body 40 for refining molten glass in accordance one or more illustrative embodiments of the present disclosure.

The porous body 40 includes a longitudinal axis L, an inlet 42, and an outlet 44 in fluid communication with the inlet 42 and spaced apart from the inlet 42 along the longitudinal axis L. The porous body 40 includes a labyrinth of open pores 46 through which a stream of molten glass can flow between the inlet 42 and the outlet 44 of the porous body 40. The open pores 46 are defined by walls 48 having wall surfaces 50 that interact with molten glass flowing through the porous body 40 to help reline the molten glass.

The term "inlet," as used herein, is intend include any opening or combination of openings through which a fluid can penetrate from an exterior environment into an interior, for example, into the pores 46 of the porous body 40. As such, the inlet 42 of the porous body 40 may include one or more sides, faces, surfaces, and/or portions of the porous body 40 into which molten glass can flow. Likewise, the term "outlet," as used herein, is intended to include any opening or combination of openings through which a fluid can pass from an interior environment to an exterior. As such, the outlet 44 of the porous body 40 may include one or more sides, faces, surfaces, and/or portions of the porous body 40 from which molten glass can exit the porous body 40. For example, an inlet may include an upstream end of the porous body 40 and an outlet may include a downstream end of the porous body 40. With respect to the porous body 40, the term "upstream" is intended to encompass any side, face, surface, end or portion of the porous body 40 where molten glass is received, and the term "downstream" is intended to encompass any side, face, surface, end or portion of the porous body 40 from which molten glass exits.

The size of the pores 46 within the porous body 40 may be substantially uniform throughout the porous body 40, or the size of the pores 46 may vary in a gradual or step-wise manner along the longitudinal axis L of the porous body 40. Establishing a pore size gradient within the porous body 40 may enhance the refining function of the porous body 40. For example, gradually decreasing the size of the pores 46 within the porous body 40 may lead to an increase in the incidence of gas bubble contact and also may lead to an increase in the incidence of contact between the gas bubbles and the wall surfaces 50.

In some embodiments, the sizes of the pores 46 in the porous body 40 may transition or progress in a gradual or step-wise manner along the longitudinal axis L of the porous body 40. For example, sizes of the pores 46 in the porous body 40 may transition from small to large, or vice versa, along the longitudinal axis L of the porous body 40 such that one area of the porous body 40 will have finer or coarser pores 46 than another. In other embodiments, the sizes of the pores 46 within the porous body 40 may vary in other ways. For example, the pores 46 within the porous body 40 may vary from larger to smaller, and/or to larger again.

Figure 2:
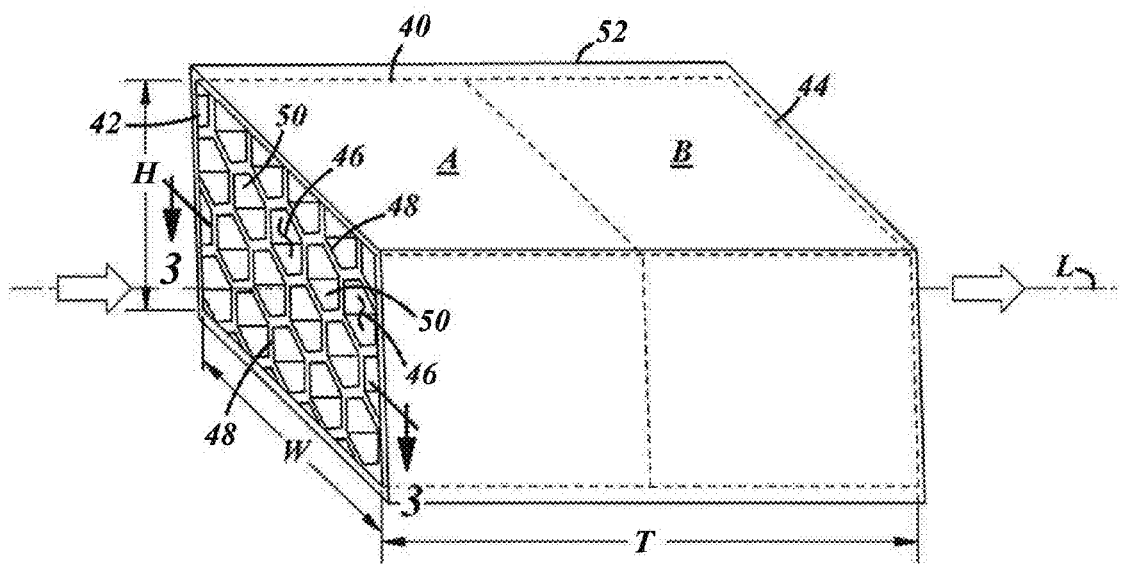
FIG. 2 is a schematic perspective front-side view of a porous body for refining a stream of molten glass in accordance with one embodiment of the present disclosure.
Figure 3:
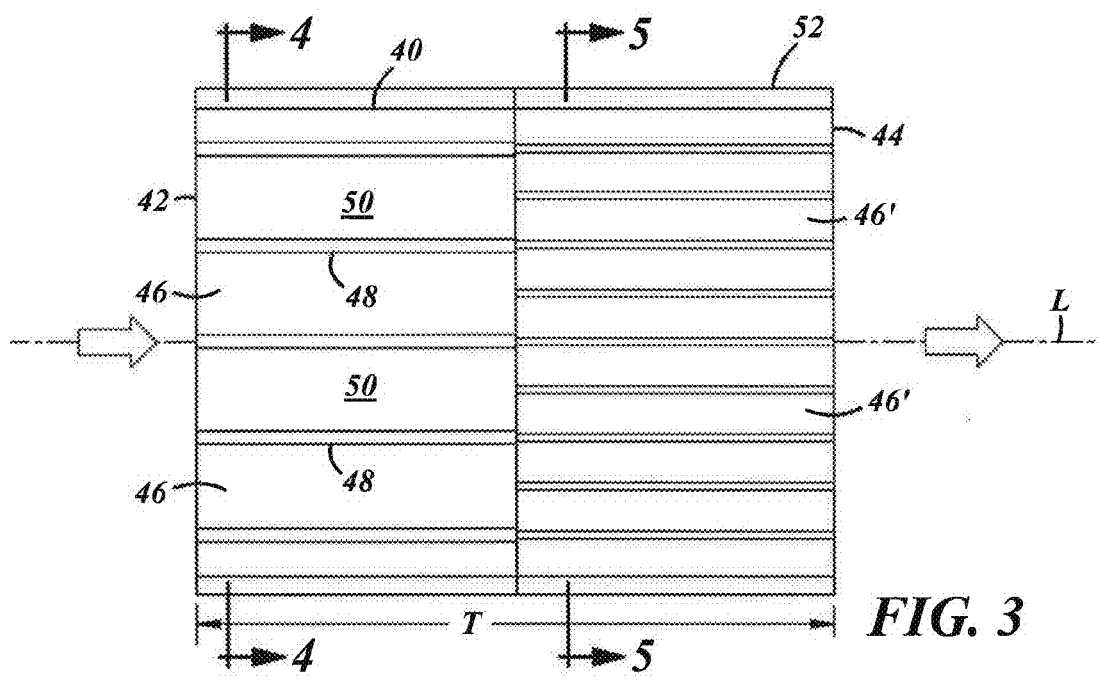
FIG. 3 is a schematic cross-sectional view of the porous body of FIG. 2 taken in the direction of arrows 3-3 in FIG. 2.
Figure 4:
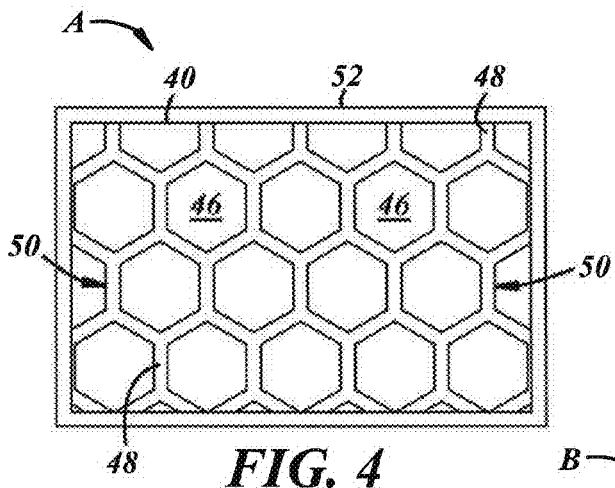
FIG. 4 is a schematic cross-sectional view of the porous body of FIG. 2 taken in the direction of arrows 4-4 in FIG. 3.
Figure 5:
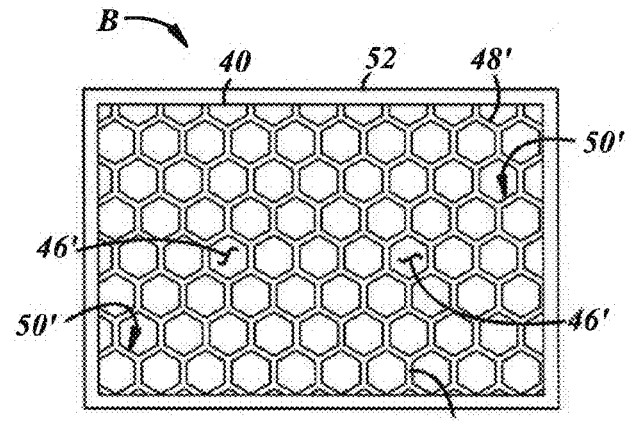
FIG. 5 is a schematic cross-sectional view of the porous body of FIG. 2 taken in the direction of arrows 5-5 in FIG. 3.

The porous body 40 may be monolithic, or of unitary construction, i.e., formed from a single piece or the porous body 40 may be an integral assembly of parts. For example, as illustrated in FIGS. 2-3, the porous body 40 may be segmented, and may include two or more serially arranged independently monolithic portions or segments A, B that have been brought together to form a unit. The serially arranged segments A, B illustrated in FIGS. 2-3 are positioned side-by side, however, in other embodiments, the segments A, B may be stacked on top of one another. Constructing the porous body 40 from two or more serially arranged segments A, B may provide the porous body 40 with different chemical and/or mechanical properties in different areas of the porous body 40. For example, as illustrated in FIGS. 2-3, the pores 46 in segment A may be relatively large (FIG. 4), as compared to the pores 46 in segment B (FIG. 5), which may provide the porous body 40 with a pore size gradient.

The segments A, B of the porous body 40 may be held within or supported by a housing or frame 52. In some embodiments, the segments A, B may be supported within separate frames, which may be adapted to mate with one another or to otherwise fit together to unite the segments A, B with one another to form an integral unit. For example, the segments A, B may be tongue and groove mated.

In the embodiments illustrated in FIGS. 2-5, the porous body 40 is enclosed by the frame 52 such that molten glass flowing through the porous body 40 is contained within the frame 52, similar to the flow of a liquid through a closed conduit. In such case, the molten glass may not have a free surface. In other embodiments, however, the porous body 40 may be held within or supported by a housing, frame, or other structure that does not completely enclose the porous body 40, e.g., an open channel. In such case, a volume of molten glass that is flowing through, around, and/or over the porous body 40 will have a free surface.

In some embodiments, the segments A, B may be separated by a gap, which may provide an outlet for gas bubbles entrapped within the porous body 40 to escape therefrom. The gap may be in fluid communication with a conduit, e.g., a vent or chimney-like structure, which may provide a pathway for gas bubbles entrapped within the porous body 40 to be transported away from the porous body 40, for example, towards a free surface of the molten glass within the furnace 10. The porous body 40, the gap, and/or the conduit may be oriented at an angle that may encourage gas bubbles within the porous body 40 to flow away from the porous body 40 and/or to flow away from the gap.

As best shown in FIGS. 2 and 3, the porous body 40 has a longitudinal depth or thickness T defined by the distance between the inlet 42 and the outlet 44 of the porous body 40 in a direction parallel to the longitudinal axis L thereof. The thickness T of the porous body 40 may be controlled or adjusted to provide a desired residence time for a stream of molten glass within the porous body 40. Accordingly, the thickness T of the porous body 40 may be selected based upon the flow rate of the stream of molten glass that will be flowing through the porous body 40 in the glass furnace 10. A suitable thickness T for the porous body 40 may be in the range of 0.25 inches to 6 inches, including all ranges and subranges therebetween. In some embodiments, the porous body 40 may have a thickness T in the range of 1 inch to 2.5 inches, including all ranges and subranges therebetween.

The porous body 40 illustrated in FIGS. 2-5 has a substantially rectangular cross-sectional shape in a direction orthogonal to the longitudinal axis A that is defined by a height H and a breadth or width W. In this embodiment, the thickness T of the porous body 40 is greater than its width W, and the width W of the porous body 40 is greater than its height H. Accordingly, the thickness to width T/D and thickness to height T/H aspect ratios of the porous body 40 are both greater than one. In other embodiments, however, the width W and/or height H of the porous body 40 may be greater than the thickness T of the porous body 40. A suitable width W for the porous body 40 may be in the range of 4-12 inches, and a suitable height H for the porous body 40 may be in the range of 6-18 inches, including all ranges and subranges between the aforementioned ranges.

In further embodiments, the porous body 40 may take on different cross-sectional shapes. For example, the cross-sectional shape of the porous body 40 in a direction parallel to or orthogonal to the longitudinal axis A of the porous body 40 may be circular, elliptical, annular, square, triangular, hexagonal, or any other suitable shape. In addition, the cross-sectional shape and/or the cross-sectional area of the porous body 40 may vary along the length L, width W, and/or height H of the porous body 40.

The size and shape of the porous body 40 may be selected based upon the flow rate and/or the temperature of the molten glass that will be flowing through the porous body 40 in the glass furnace 10. Molten glass flowing through a conventional glass furnace will typically have a velocity in the range of 0.5 millimeters per second (mm/sec) to 5 mm/sec, including all ranges and subranges therebetween. Accordingly, the size and shape of the porous body 40 may be designed to accommodate streams of molten glass flowing at velocities within the aforementioned ranges. In some embodiments, the size and shape of the porous body 40 may be configured to accommodate between 5 gallons of molten glass and 25 gallons of molten glass per hour, including all ranges and subranges therebetween. The porous body 40 also may be configured to accommodate a stream of molten glass having a temperature in the range of 500 degrees Celsius to 1700 degrees Celsius.

The size of the pores 46 in the porous body 40 may be selected to provide a desired flow rate of molten glass through the porous body 40 and to prevent backpressure, and may be based upon the temperature and the viscosity of the molten glass. For example, a porous body 40 having pores 46 that are relatively small in size may be used for refining molten glass that has a relatively high temperature and a relatively low viscosity, e.g., a temperature in the range of 1000 degrees Celsius to 1750 degrees Celsius, including all ranges and subranges therebetween.

The shape and orientation of the pores 46 of the porous body 40 may be uniform or random, and may provide a substantially linear flow path and/or a tortuous flow path through the porous body 40.

In the embodiments illustrated in FIGS. 2-5, the porous body 40 has a honeycomb structure and includes a plurality of hexagonally shaped pores 46, 46 that extend substantially parallel to one another from the inlet 42 to the outlet 44 of the porous body 40. In addition, the central axes of the pores 46, 46' are oriented in a common direction that is substantially parallel to the longitudinal axis A of the porous body 40. Accordingly, the pores 46, 46' do not intersect one another along the thickness T of the porous body 40. In other embodiments, however, the porous body 40 may include pores with different cross-sectional shapes and/or with different orientations. For example, in other embodiments, the pores 46, 46' of the porous body 40 may have round, square, or oval cross-sectional shapes. In addition, the pores 46, 46' of the porous body 40 may be oriented in multiple different directions.

Figure 6:
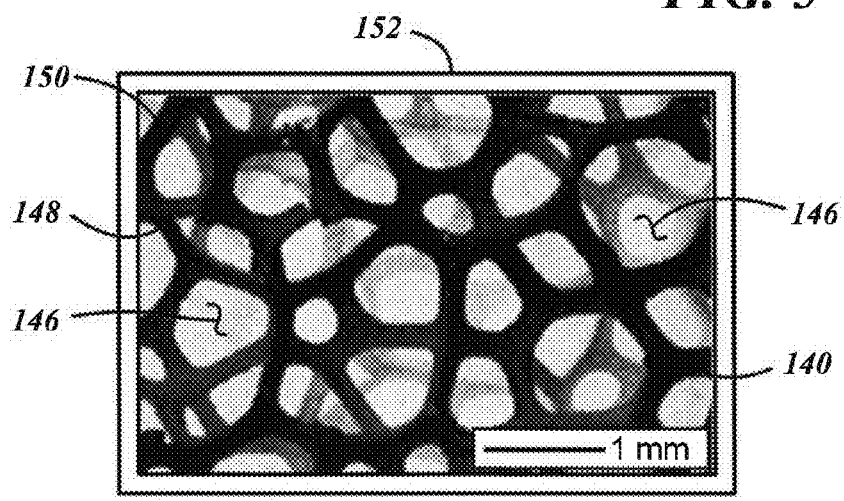
FIG. 6 is a schematic cross-sectional view of a porous body in accordance with another illustrative embodiment of the present disclosure.

FIG. 6 illustrates another embodiment of a porous body 140 for refining molten glass in accordance with the present disclosure. This embodiment is similar in many respects to the embodiment of FIGS. 2-5 and like numerals among the embodiments generally designate like or corresponding elements throughout the several views of the drawing figures. Accordingly, the descriptions of the embodiments are incorporated into one another, and description of subject matter common to the embodiments generally may not be repeated here.

The porous body 140 illustrated in FIG. 6 has a reticulated or foam-like structure and includes a labyrinth of interconnected irregularly shaped open pores 146 that are oriented in a plurality of random directions along the longitudinal axis of the porous body 140.

In some embodiments, the porous body 140 may have wall surfaces 148 that are rough or irregular in contour, as this may enhance the refining function of the porous body 140. Accordingly, the surface roughness average (Ra) of the wall surfaces 148 is preferably greater than 600 microinches (μin). In some embodiments, the surface roughness average (Ra) of the wall surfaces 148 may be in the range of 1-10,000 microinches (μin), including all ranges and subranges therebetween. For example, the surface roughness average (Ra) of the wall surfaces 148 may be in the range of 100-6,000 microinches (μin), including all ranges and subranges therebetween. Depending upon the refining situation, the surface roughness average (Ra) of the wall surfaces 148 may be: greater than or equal to 1,000 μin, 2,500 μin, 4,000 pin, or 5,000 μin; less than or equal to 10,000 μin, 9,000 μin, 8,000 μin, or 7,000 μin; or between 1,000-10,000 μin, 2,500-10,000 μin, 4,000-10,000 μin, or 5,000-10,000 μin, to cite a few specific examples.

Also, the wall surfaces 148 of the porous body 140 may be configured to resist the flow of molten glass through the porous body 140, for example, due to adhesion between the molten glass and the wall surfaces 148 of the porous body 140. In such case, the resistance of molten glass flow through the porous body 140 due to adhesion forces may be in the range of 0 N to 1000 N, including all ranges and subranges therebetween.

A rough or irregular surface may be produced on the walls 148 of the porous body 140, for example, by depositing whiskers or needle-shaped structures onto the walls 148 using a chemical vapor deposition technique, or by etching the wall surfaces 148 with an acid or any other suitable etchant. The whiskers or needle-shaped structures may have diameters of less than one micron and lengths of a few micrometers or more. In other embodiments, the walls 150 of the porous body 140 may be porous themselves, which may contribute to the rough or irregular wall surfaces 148.

In other embodiments, the wall surfaces 148 of the porous body 140 may range from relatively smooth to relatively rough, or vice versa.

Figure 7:
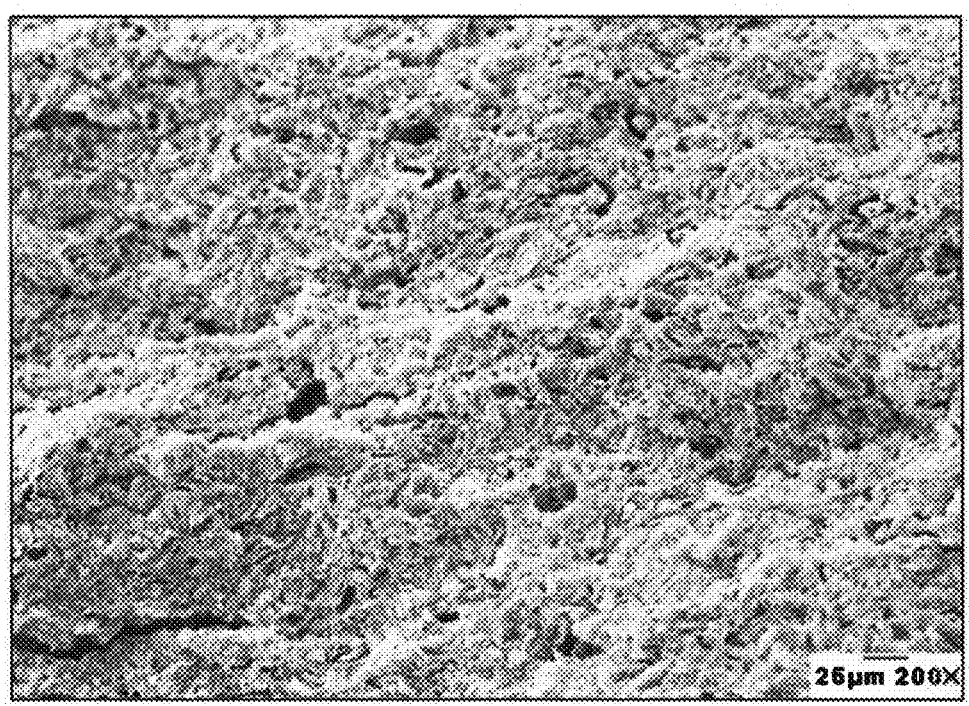
FIG. 7 is an electron micrograph of a wall surface of a porous body in accordance with yet another illustrative embodiment of the present disclosure.

FIG. 7 is an electron micrograph of a porous ceramic material that has relatively smooth wall surfaces. The ceramic material in FIG. 7 includes a plurality of ceramic particles that have been fused to one another through a sintering process.

Figure 8:
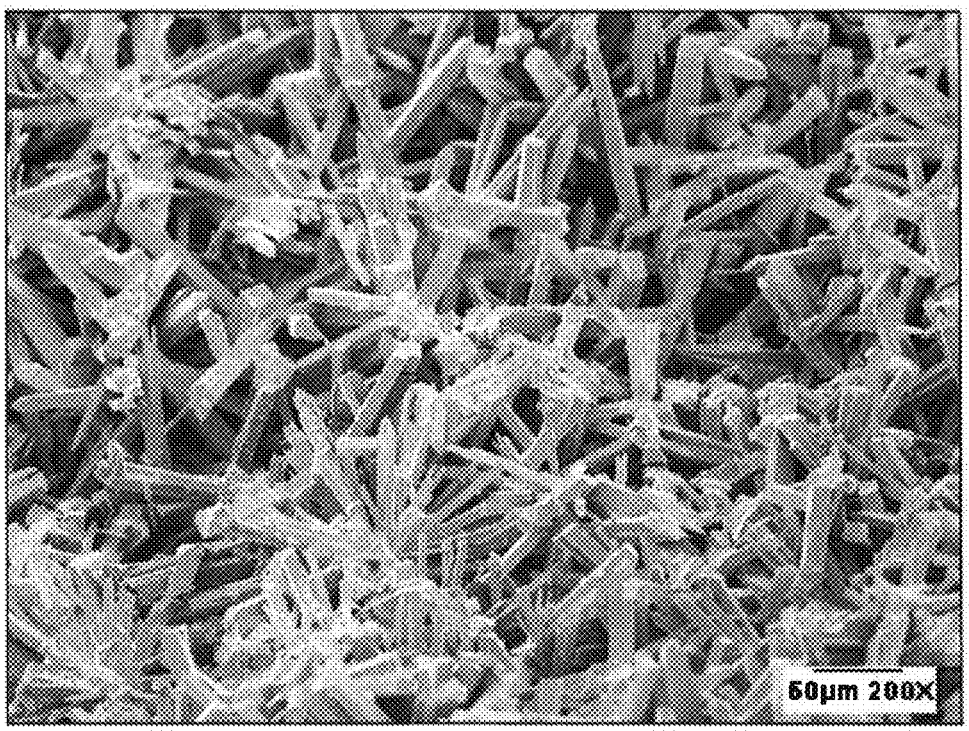
FIG. 8 is an electron micrograph of a wall surface of a porous body in accordance with a further illustrative embodiment of the present disclosure.

FIG. 8 is an electron micrograph of a porous ceramic material that has relatively rough, irregularly shaped wall surfaces. The ceramic material in FIG. 8 has open interconnected pores that are formed by a plurality of interconnected crystalline "needles".

The walls 148 and/or the wall surfaces 150 of the porous body 140, and optionally the frame 152, may be formed from and/or coated with any suitable material or combination of materials that can maintain its structural properties under the high temperature and corrosive environmental conditions that exist within a glass furnace. For example, the walls 148 and/or the wall surfaces 150 of the porous body 140, and optionally the frame 152, may be formed from and/or coated with various refractory metals, carbides, borides, nitrides, oxides, or combinations thereof. Some specific examples of suitable refractory materials include molybdenum, alumina, zirconia, silica, mullite, silicon carbide, tungsten carbide, boron carbide, silicon carbonitride, silicon, and combinations thereof. Such materials may be shape-machined or cast into the shape of the porous body 140.

The porous body 140 may be constructed in a manner which will provide the porous body 140 with sufficient rigidity and strength. Some examples of suitable porous structures include reticulated ceramic materials (also referred to as ceramic foams), bonded ceramic particles, and/or extruded ceramic materials (e.g., extruded ceramic honeycomb materials). Suitable reticulated ceramic materials may be produced by dipping a polyurethane precursor material in a ceramic-containing slurry, and then heat-treating the ceramic-coated precursor material to decompose the precursor material and form a porous ceramic body. Suitable bonded ceramic particulate materials may be made of fused or tabular ceramic particles held together by a ceramic binder. Other suitable porous ceramic materials may be produced using a three-dimensional printing process or by an extrusion process, in which a mixture of a ceramic slurry and a binder are extruded together to form an extruded ceramic structure that may be coated with additional ceramic materials, dried, and sintered to produce a porous ceramic body.

FIGS. 9A-13 illustrate additional embodiments of apparatuses for refining molten glass that include one or more porous bodies through which the molten glass to be refined is passed. These embodiments are similar in many respects to the embodiment of FIGS. 2-8. Accordingly, the descriptions of the embodiments are incorporated into one another, and description of subject matter common to the embodiments generally may not be repeated here.

Figure 9A:
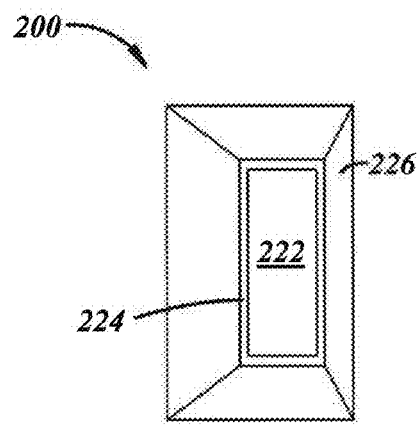
FIGS. 9A and 9B are schematic top and side cross-sectional views of an apparatus for refining molten glass in accordance with an illustrative embodiment of the present disclosure.
Figure 9B:
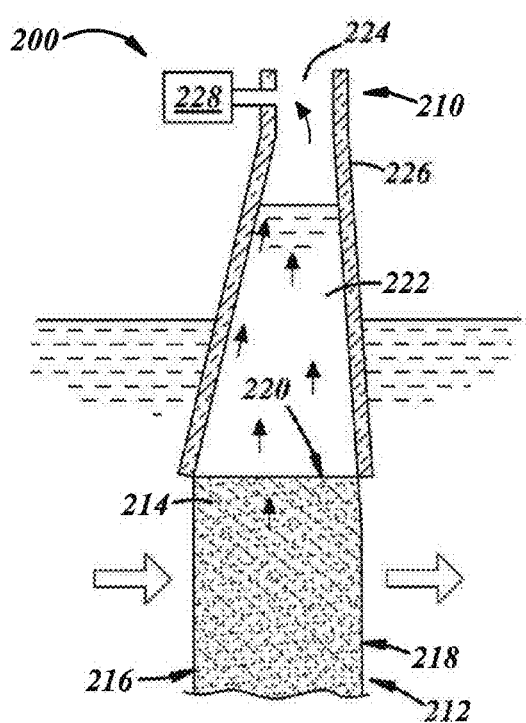

Referring now to FIGS. 9A and 9B, which illustrate top and side cross-sectional views, respectively, of an apparatus 200 for refining molten glass in accordance with an illustrative embodiment of the present disclosure. The apparatus 200 includes a top end 210 that extends above a free surface of a flow of molten glass and a bottom end 212 that is immersed in the flow path of the molten glass. The bottom end 212 of the apparatus 200 includes a porous body 214 having an inlet 216 through which the flow of molten glass is received and an outlet 218 through which the molten glass exits the porous body 214. The porous body 214 also includes an upper surface 220 that is in fluid communication with a generally vertical passageway 222 that extends through the apparatus 200, from the upper surface 220 of the porous body 214 to an opening 224 at the top end 210 of the apparatus 200. The vertical passageway 222 may be bounded by a sheath, housing, or walls 226 that are constructed of a non-porous refractory material, e.g., a non-porous refractory metal, carbide, boride, nitride, oxide, or a combination thereof.

Molten glass is received at the inlet 216 of the porous body 214 and is discharged from the outlet 218 of the porous body 214. As the molten glass flows between the inlet and the outlet 216, 218 of the porous body 214, gas bubbles within the molten glass may be encouraged to ascend through the molten glass towards the upper surface 220 of the porous body 214. Gas bubbles that are released from the molten glass during this process may be directed away from the porous body 214, through the vertical passageway 222, and out the opening 224 at the top end 210 of the apparatus 200.

The apparatus 200 also may include a vacuum pump and evacuation system 228 that can be used to create a sub-atmospheric pressure environment within the vertical passageway 222. In such case, although not illustrated in FIGS. 9A and 9B, the vertical passageway 222 may be enclosed, for example, by placing a cover over the opening 224 at the top end 210 of the apparatus 200. The sub-atmospheric pressure environment within the vertical passageway 222 may help increase the rate at which gas bubbles within the flowing stream of molten glass ascend through the molten glass and are released therefrom.

Figure 10:
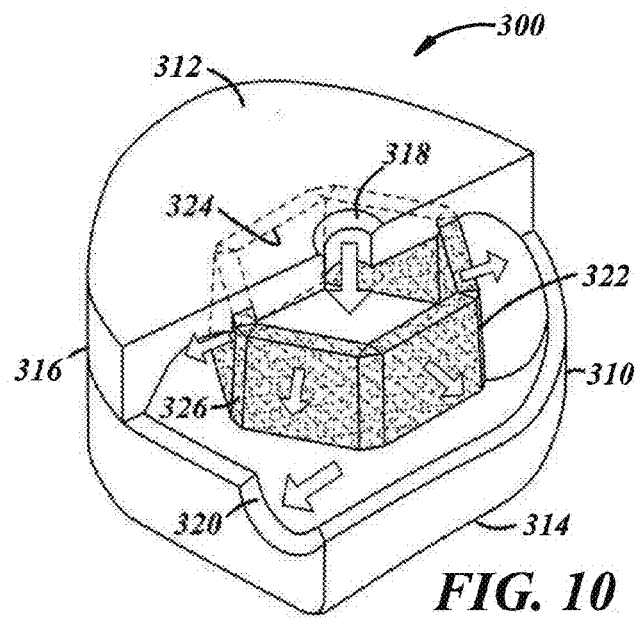
FIG. 10 is a fragmentary perspective view of an apparatus for refining molten glass in accordance with another illustrative embodiment of the present disclosure.

FIG. 10 illustrates an apparatus 300 for refining molten glass in accordance with another illustrative embodiment of the present disclosure. The apparatus 300 includes a housing 310 having a top 312 (shown fragmented), a bottom 314, a sidewall 316, an inlet 318 located in the top 312 of the housing 310, and an outlet 320 located in the sidewall 316 of the housing 310. The apparatus 300 also includes a generally annular porous body 322 having an interior 324 and an exterior 326 that extends between the top 312 and the bottom 314 of the housing 310, between the inlet 318 and the outlet 320. The annular porous body 322 may be monolithic, or may be an assembly or integration of a plurality of monolithic porous body portions. The housing 310, including the top 312, bottom 314, and sidewall 316 of the housing 310, may be made of a refractory material, e.g., a refractory metal, carbide, boride, nitride, oxide, or a combination of one or more of these refractory materials.

Molten glass enters the housing 310 through the inlet 318 and is received in the interior 324 of the annular porous body 322. A pressure differential may be established across the annular porous body 322 such that the molten glass flows in a generally radially direction from the interior 324 to the exterior 326 of the annular porous body 322. Also, in some embodiments, the bottom 314 of the housing 310 and the annular porous body 322 may be configured to rotate such that the molten glass is subjected to a centrifugal force, which causes the molten glass to flow a generally radially direction from the interior 324 to the exterior 326 of the annular porous body 322. As the molten glass is flowed through the porous body 322, gas bubbles within the molten glass may be encouraged to rise through the molten glass and escape.

Figure 11:
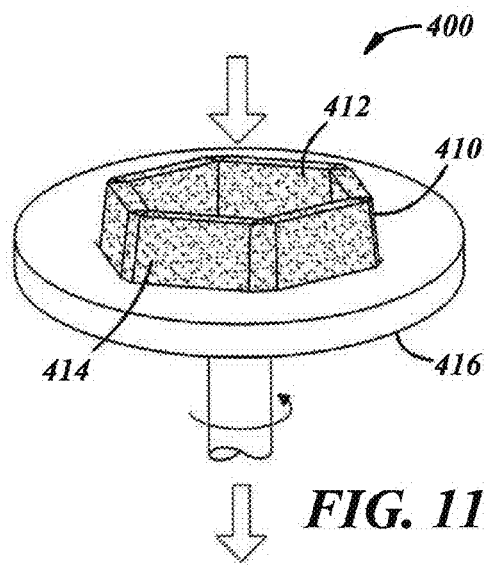
FIG. 11 is a perspective view of an apparatus for refining molten glass in accordance with yet another illustrative embodiment of the present disclosure.

FIG. 11 illustrates an apparatus 400 for refining molten glass in accordance with yet another illustrative embodiment of the present disclosure. The apparatus 400 includes a generally annular porous body 410 having an interior 412 and an exterior 414 that is carried by a rotating base 416. Molten glass is received in the interior 412 of the porous body 410 and is subjected to a centrifugal force such that the molten glass flows in a generally radially direction from the interior 412 to the exterior 414 of the porous body 410. After the molten glass flows through the porous body 410, it is collected by the base 416 and directed in a generally downward direction away from the porous body 410. As the molten glass flows through the porous body 410, gas bubbles within the molten glass are encouraged to rise through the molten glass and escape. The base 416 may be made of a refractory material, e.g., a refractory metal, carbide, boride, nitride, oxide, or a combination thereof.

In another embodiment, the apparatus 400 may be integrated with the apparatus 300. For example, the apparatus 300 may be carried on the base 416 and rotated to promote flow of molten glass through the apparatus 300.

Figure 12:
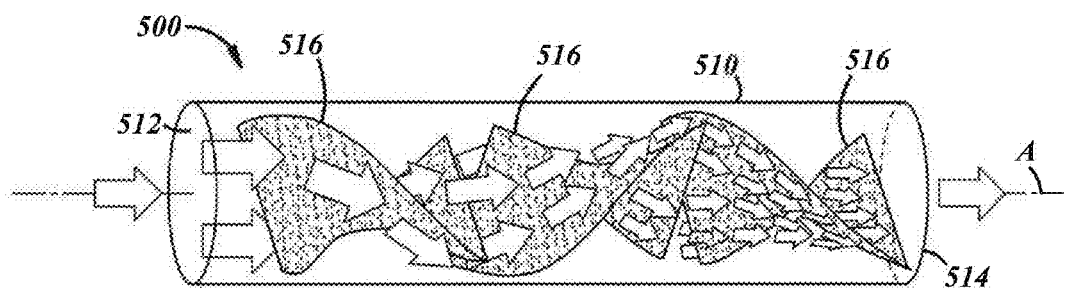
FIG. 12 is a perspective view of an apparatus for refining molten glass in accordance with another illustrative embodiment of the present disclosure.

FIG. 12 illustrates an apparatus 500 for refining molten glass in accordance with another illustrative embodiment of the present disclosure. The apparatus 500 includes a conduit 510 having an inlet 512, an outlet 514, and one or more porous bodies 516 serially arranged within the conduit 510, along a longitudinal axis A thereof. Molten glass is received at the inlet 512 of the conduit 510 and is flowed towards the outlet 514 of the conduit 510. As the molten glass flows from the inlet 512 to the outlet 514 of the conduit 510, the porous bodies 516 mix the molten glass and also interact with the molten glass in a manner which encourages gas bubbles within the molten glass to rise to a free surface thereof and escape.

The conduit 510 may be cylindrical, rectangular, or of any other suitable shape, and may be composed of metal, refractory material, ceramic, or any other suitable material(s). The porous bodies 516 may be of any suitable shape that promotes mixing and interaction with the molten glass, for example, the porous bodies 516 may be twisted, spiral, or helically shaped. Also, the conduit 510 may be made of a refractory material, e.g., a refractory metal, carbide, boride, nitride, oxide, or a combination thereof.

Figure 13:
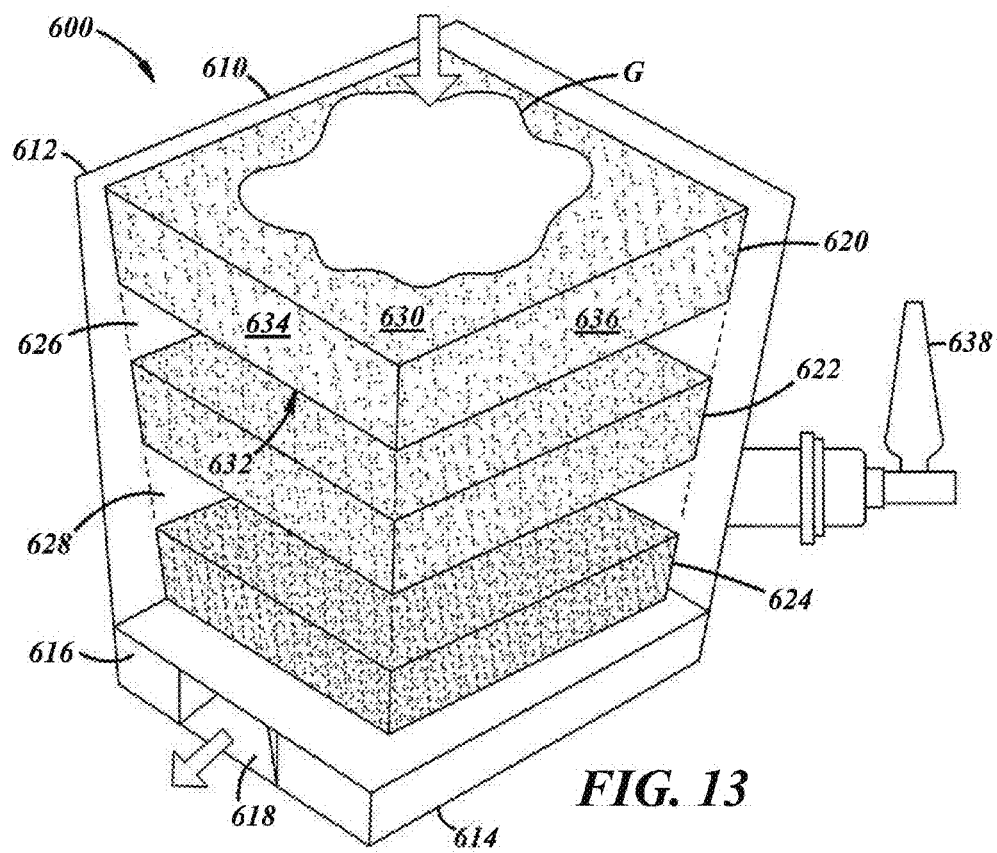
FIG. 13 is a perspective view of an apparatus for refining molten glass in accordance with another illustrative embodiment of the present disclosure.

FIG. 13 illustrates an apparatus 600 for refining molten glass in accordance with another illustrative embodiment of the present disclosure. The apparatus 600 includes a housing 610 having a top 612, a bottom 614, and a sidewall 616. An outlet 618 may be located in the sidewall 616 at the bottom 614 of the housing 610. The housing 610 may be made of a refractory material, e.g., a refractory metal, carbide, boride, nitride, oxide, or a combination thereof. The apparatus 600 also includes first, second, and third porous bodies 620, 622, 624 that are serially arranged one above the other within the housing 610. In the embodiment illustrated in FIG. 13, the pore size of the porous bodies 620, 622, 624 decreases in a step-wise manner, with the first porous body 620 having relatively coarse porosity and the third porous body 624 having relatively fine porosity. However, in other embodiments, the pore size of the porous bodies 620, 622, 624 may be substantially the same.

The porous bodies 620, 622, 624 may be separated from one another in the housing 610 by first and second gaps 626, 628. Although not illustrated, the gaps 626, 628 may be in fluid communication with one or more conduits, which may provide pathways for gas bubbles that have been released from the molten glass to be transported away from the molten glass and away from the housing 610.

Molten glass G may be received at a top 630 of the first porous body 620, for example, by being poured over the top 630 of the first porous body 620 to form a puddle of molten glass G. Thereafter, the molten glass G may flow, for example, by gravity from the top 630 to a bottom 632 of the first porous body 620 and then into the first gap 626 between the first and second porous bodies 620, 622. In other embodiments, molten glass G may be received at the top 630 of the first porous body 620 and may be spread out in multiple directions through the porous body 620, for example, towards and through one or more sides 634, 636 of the porous body 620. In either case, as the molten glass G flows through the first porous body 620, gas bubbles within the molten glass may be encouraged to rise through the molten glass and escape therefrom. For example, gas bubbles may escape from the molten glass G through the sides 634, 636 of the first porous body 620. Thereafter, the molten glass G may flow through the second and third porous bodies 622, 624 in a similar manner and may exit the housing 610 via the outlet 618 at a level below that of the third porous body 624.

In other embodiments, the apparatus 600 may include a single porous body and may be coupled to another downstream apparatus, similar to apparatus 600, that also includes one or more porous bodies.

The apparatus 600 also may include a heater 638 that provides heat to the porous bodies 620, 622, 624 and/or the molten glass during the refining process. For example, the heater 638 may include a gas burner that may direct flames beneath one or more of the porous bodies 620, 622, 624. In some embodiments, the heater 638 may be used to preheat the porous bodies 620, 622, 624 before molten glass is introduced into the housing 610 and passed through the porous bodies 620, 622, 624. Preheating the porous bodies 620, 622, 624 may help reduce degradation of the porous bodies 620, 622, 624 due to thermal shock.

EXAMPLES

Two reticulated ceramic materials having different pore sizes were preheated in a laboratory environment to a temperature of about 900° C. in an oven. Molten glass having a temperature of about 1450° C. and including a plurality of gas bubbles was then poured onto one side of the preheated ceramic materials, and a flow of molten glass was collected from an opposite side of the ceramic materials. The collected molten glass was then analyzed to determine the size and content of gas bubbles therein.

Example 1

Molten glass having a container glass composition that included 77 wt % $SiO_2$, 16 wt % $Na_2O$, and 5 wt % CaO was prepared and poured over a reticulated ceramic material made of silicon carbide. The silicon carbide material included 8 pores per inch (ppi) with pores ranging in size from 3 mm to 10 mm. The pores in the silicon carbide material were defined by walls having thicknesses in the range of 0.5 mm to 1 mm.

The molten container glass composition initially had gas bubbles ranging in size from 0.2-0.3 mm. After the molten glass was filtered through the silicon carbide material, the molten glass included gas bubbles ranging in size from mm, which represents a 2-to-3 fold increase in the size of the gas bubbles within the molten glass. Increasing the size of the gas bubbles within the molten glass may speed up the refining process because the resulting relatively large gas bubbles will be able to ascend through the molten glass at a faster rate than the initial relatively small gas bubbles.

The increase in gas bubble size may be the result of free carbon in the silicon carbide material reacting with the molten glass to form carbon dioxide gas. The newly formed carbon dioxide gas may then coalesce with the existing gas bubbles in the molten glass to produce larger gas bubbles. Other materials that contain free carbon also may react with the molten glass in this way to produce larger gas bubbles and that can more rapidly be removed from the molten glass, as compared to the initial relatively small gas bubbles within the molten glass.

Example 2

A sodium silicate glass that included 61.2 wt % $SiO_2$ and 38.8 wt % $Na_2O$ was prepared and poured over a reticulated ceramic material made of alumina. The alumina material included 25 pores per inch (ppi) with pores ranging in size from 1 min to 3 mm. The pores in the alumina material were defined by walls having thicknesses in the range of 0.5 mm to 1 mm.

The sodium silicate glass initially had gas bubbles that were about 1 mm in size. After the molten glass was filtered through the alumina material, the molten glass included gas bubbles that were about 0.5 mm in size, which represents a 50% decrease in the size of the gas bubbles within the molten glass. Similarly sized gas bubbles also were observed on the walls of the pores within the alumina material.

There thus has been disclosed an apparatus and a process for refining molten glass, that fully satisfies one or more of the objects and aims previously set forth. The disclosure has been presented in conjunction with several illustrative embodiments, and additional modifications and variations have been discussed. Other modifications and variations readily will suggest themselves to persons of ordinary skill in the art in view of the foregoing discussion. For example, the subject matter of each of the embodiments is hereby incorporated by reference into each of the other embodiments, for expedience. The disclosure is intended to embrace all such modifications and variations as fall within the spirit and broad scope of the appended claims.

The invention claimed is:
1. An apparatus for producing molten glass including:
a chamber through which molten glass flows from an upstream end to a downstream end thereof;
a porous body disposed within said chamber and having an inlet, an outlet in fluid communication with said inlet, an upper surface extending between said inlet and said outlet, a plurality of pores through which molten glass can flow between said inlet and said outlet, and an effective porosity in the range of 0.75 to 0.95; and
a vacuum pump and evacuation system in fluid communication with said upper surface of said porous body that creates a sub-atmospheric pressure environment at said upper surface of said porous body.

2. The apparatus as defined in claim 1 including:
a vent to vent gas bubbles away from said upper surface of said porous body.

3. The apparatus as defined in claim 1 wherein said porous body is of unitary construction.

4. The apparatus as defined in claim 1 wherein said pores are defined by walls having wall surfaces, and wherein said wall surfaces include at least one material selected from the group consisting of silicon carbide (SiC), silicon nitride ($Si_3N_4$), and silicon carbonitride (SiCN).

5. An apparatus for producing molten glass including:
a chamber;
a porous body disposed within said chamber and having an inlet, an outlet in fluid communication with said inlet, an upper surface extending between said inlet and said outlet, and a plurality of pores through which molten glass can flow between said inlet and said outlet; and
a vacuum pump and evacuation system in fluid communication with said upper surface of said porous body that creates a sub-atmospheric pressure environment at said upper surface of said porous body.

6. The apparatus as defined in claim 5 wherein said porous body has a three-dimensional shape selected from the group consisting of a sphere, an ellipsoid, a cube, a rectangular prism, a triangular prism, a pyramid, a cylinder, and a cone.

7. The apparatus as defined in claim 5 wherein said porous body has an effective porosity in the range of 0.75 to 0.95.

8. The apparatus as defined in claim 5 wherein said pores are defined by walls having wall surfaces, and said wall surfaces have a surface roughness average of greater than 600 microinches.

9. The apparatus as defined in claim 5 including:
a vent to vent gas bubbles away from said upper surface of said porous body.

10. The apparatus as defined in claim 5 wherein said porous body is of unitary construction.

11. The apparatus as defined in claim 5 wherein said porous body has a width, a height, and a thickness orthogonal to said width and said height, said thickness being defined between said inlet and said outlet of said porous body, and wherein a ratio of said thickness to at least one of said width or said height is greater than one.

12. The apparatus as defined in claim 5 including:
a top end, a bottom end, and a generally vertical passageway extending therethrough.

13. The apparatus as defined in claim 12 wherein said generally vertical passageway extends from said upper surface of said porous body to an opening at said top end of said apparatus.

14. The apparatus as defined in claim 12 wherein said generally vertical passageway is bounded by a sheath, housing, or walls constructed of a non-porous refractory material.

15. The apparatus as defined in claim 14 wherein said non-porous refractory material comprises a non-porous refractory metal, carbide, boride, nitride, oxide, or a combination thereof.

16. An apparatus for refining molten glass that includes:
a first porous body having a first inlet, a first outlet in fluid communication with said first inlet, a first surface extending between said first inlet and said first outlet, and a plurality of pores through which molten glass can flow between said first inlet and said first outlet; and
a second porous body having a second inlet, a second outlet in fluid communication with said second inlet, a second surface extending between said second inlet and said second outlet, and a plurality of pores through which molten glass can flow between said second inlet and said second outlet; and
a vacuum pump and evacuation system in fluid communication with said first surface of said first porous body and said second surface of said second porous body that creates a subatmospheric pressure environment at said first surface of said first porous body and at said second surface of said second porous body,
wherein said first porous body and said second porous body are serially arranged.

17. The apparatus as defined in claim 16 wherein said pores are defined by walls having wall surfaces, and wherein said wall surfaces of said pores of at least one of said first porous body and said second porous body are made of at least one material selected from the group consisting of silicon carbide (SiC), silicon nitride ($Si_3N_4$), and silicon carbonitride (SiCN).

18. The apparatus as defined in claim 16 wherein at least one of said first porous body and said second porous body has an effective porosity in the range of 0.75 to 0.95.

19. The apparatus as defined in claim 16 wherein said pores of said first porous body and said second porous body provide a pore size gradient in said molten glass flow direction.

20. The apparatus as defined in claim 16 wherein said pores of at least one of said first porous body and said second porous body define a three-dimensional network of interconnected open pores.

21. The apparatus as defined in claim 16 wherein said pores have axes that are oriented parallel to one another in a direction substantially parallel to said molten glass flow direction.

22. The apparatus as defined in claim 16 wherein said pores do not include voids that exist within a collection of discrete particles, aggregates, or fibers that have been packed into a volume.

23. The apparatus as defined in claim 16 wherein each of said first porous body and said second porous body is of unitary construction.

24. The apparatus as defined in claim 16 that includes:
a conduit in fluid communication with a space between said first porous body and said second porous body through which gas bubbles are vented away from said first porous body and said second porous body.

25. A glass furnace comprising the apparatus as defined in claim 1.

26. A glass furnace comprising the apparatus as defined in claim 5.

27. A glass furnace comprising the apparatus as defined in claim 16.

28. An apparatus comprising:
a chamber
a porous body disposed within the chamber and having an inlet, an outlet in fluid communication with the inlet, a surface extending between the inlet and the outlet, a plurality of pores through which molten glass can flow between the inlet and the outlet; and
a vacuum pump and evacuation system in fluid communication with the surface of the porous body that creates a sub-atmospheric pressure environment at the surface of the porous body.

29. A glass furnace comprising the apparatus as defined in claim 28.

30. The glass furnace as defined in claim 29 comprising a melter and a refiner downstream of the melter.

\* \* \* \* \*